(12) United States Patent
Li

(10) Patent No.: US 12,556,502 B2
(45) Date of Patent: Feb. 17, 2026

(54) METHOD AND APPARATUS FOR SENDING RICH COMMUNICATION SUITE (RCS) MESSAGE

(71) Applicant: Huawei Technologies Co., Ltd., Shenzhen (CN)

(72) Inventor: Shunqing Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 18/596,339

(22) Filed: Mar. 5, 2024

(65) Prior Publication Data
US 2024/0214339 A1 Jun. 27, 2024

Related U.S. Application Data

(63) Continuation of application No. PCT/CN2022/140270, filed on Dec. 20, 2022.

(30) Foreign Application Priority Data

Dec. 27, 2021 (CN) .......................... 202111614579.7

(51) Int. Cl.
H04L 51/18 (2022.01)

(52) U.S. Cl.
CPC .................................. *H04L 51/18* (2013.01)

(58) Field of Classification Search
CPC ......... H04L 51/18; H04L 51/08; H04L 51/58; H04L 51/48; H04L 51/10; H04L 51/06; H04L 51/063; H04L 51/066; H04W 4/12; H04W 4/18; H04W 8/26; H04W 4/14; H04W 4/185

See application file for complete search history.

(56) References Cited

U.S. PATENT DOCUMENTS

| | | | |
|---|---|---|---|
| 10,264,413 B1* | 4/2019 | Bogineni | H04W 4/12 |
| 2016/0286027 A1* | 9/2016 | Lee | H04M 1/72436 |
| 2017/0374504 A1* | 12/2017 | Synal | H04L 67/54 |
| 2022/0038870 A1* | 2/2022 | Stafford | H04W 4/14 |

FOREIGN PATENT DOCUMENTS

| | | |
|---|---|---|
| CN | 109391540 A | 2/2019 |
| WO | 2018103412 A1 | 6/2018 |

OTHER PUBLICATIONS

Han Wang et al. "Middleware of Enterprise 5G Messaging Services: Design and Implementation," Dec. 10, 2021, 13 pages, XP047619890.
GSM Association, "Rich Communication Suite—Advanced Communications, Services and Client Specification," Version 11.0, Oct. 16, 2019, 389 pages.
GSM Association, "RCS Universal Profile Service Definition Document," Version 2.4, Oct. 16, 2019, 260 pages.

* cited by examiner

*Primary Examiner* — Johnny B Aguiar
(74) *Attorney, Agent, or Firm* — Conley Rose, P.C.

(57) ABSTRACT

A method includes that a rich communication suite (RCS) message sending server receives a first message sent by an RCS message application server, where the first message includes an RCS message and user identification information of a terminal device; and when determining that the terminal device does not support an RCS-type message, the RCS message sending server sends web page address information to the terminal device, where the web page address information is used for obtaining content of the RCS message from an RCS message content server.

10 Claims, 5 Drawing Sheets

METHOD AND APPARATUS FOR SENDING RICH COMMUNICATION SUITE (RCS) MESSAGE

CROSS-REFERENCE TO RELATED APPLICATIONS

This is a continuation of International Patent Application No. PCT/CN2022/140270 filed on Dec. 20, 2022, which claims priority to Chinese Patent Application No. 202111614579.7 filed on Dec. 27, 2021. The disclosures of the aforementioned applications are hereby incorporated by reference in their entireties.

TECHNICAL FIELD

This disclosure relates to the field of communication technologies, and in particular, to an information sending method and apparatus.

BACKGROUND

A Rich Communication Suite (RCS) message is a basic telecommunication service jointly launched by operators and various mobile phone manufacturers, is an upgrade of a traditional short message service (SMS) message and provides both traditional SMS and multimedia messaging service (MMS) message functions. In addition, content in a rich media form, such as texts, pictures, audio, videos, and location information, can further be sent by using an SMS application. However, because development duration of the RCS message is short, and a quantity of terminal devices that support the RCS message in the market is small, application and development of an RCS message technology is restricted.

At present, an RCS message application server supports converting an RCS message into a common SMS message or MMS message and sending the message to a terminal device. In this case, the terminal device cannot obtain and present content, in an original rich media form, in the RCS message, for example, location information or card content.

SUMMARY

Embodiments of this application provide an information sending method and apparatus, to resolve a problem that when a terminal device does not support an RCS-type message, the terminal device cannot obtain and present content, in a rich media form, in an RCS message.

According to a first aspect, an information sending method is provided. The method includes that an RCS message sending server receives a first message sent by an RCS message application server, where the first message includes an RCS message and user identification information of a terminal device; the RCS message sending server determines that the terminal device does not support an RCS-type message; and the RCS message sending server sends web page address information to the terminal device, where the web page address information is used for obtaining content of the RCS message from an RCS message content server.

According to the information sending method provided in this embodiment of this disclosure, when the terminal device does not support the RCS-type message, the terminal device may obtain, from the RCS message content server by using the web page address information, the content of the RCS message sent to a terminal user, and present content, in a rich media form, in the RCS message. This helps improve user experience.

With reference to the first aspect, in some implementations of the first aspect, the web page address information includes address information of the RCS message content server and first authentication information, and the first authentication information is used for verifying whether the terminal device is allowed to obtain the content of the RCS message.

In this embodiment of this disclosure, when the terminal device obtains the content of the RCS message from the RCS message content server, the terminal device verifies, by using the first authentication information, whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information, and does not need to perform login authentication in a manner such as by using an SMS message verification code or a user password. This simplifies operation steps of the terminal user, improves operation efficiency, and helps improve user experience.

With reference to the first aspect, in some implementations of the first aspect, before the sending web page address information to the terminal device, the method further includes that the RCS message sending server sends a second message to the RCS message content server, where the second message includes content obtaining information of the RCS message and the user identification information of the terminal device, and the content obtaining information of the RCS message is used for obtaining the content of the RCS message; and the RCS message sending server receives, from the RCS message content server, the first authentication information generated by the RCS message content server.

It may be understood that, in this embodiment of this disclosure, when the terminal device does not support the RCS-type message, the RCS message sending server sends the RCS message to the RCS message content server, so that the terminal device may obtain the content of the RCS message from the RCS message content server, and may generate the first authentication information by using the RCS message.

With reference to the first aspect, in some implementations of the first aspect, before the sending web page address information to the terminal device, the method further includes that the RCS message sending server generates the first authentication information.

It may be understood that in this embodiment of this disclosure, the first authentication information may be generated by the RCS message sending server.

With reference to the first aspect, in some implementations of the first aspect, the method further includes that the RCS message sending server receives an access request message that is of the terminal device and that is sent by the RCS message content server, where the access request message of the terminal device includes second authentication information; the RCS message sending server determines, based on the first authentication information and the second authentication information, that the terminal device is allowed to obtain the content of the RCS message; and the RCS message sending server sends an access response message of the terminal device to the RCS message content server, where the access response message of the terminal device indicates that the terminal device is allowed to obtain the content of the RCS message, where the access response message of the terminal device includes the content obtaining information of the RCS message and the user identification information of the terminal device.

In this embodiment of this disclosure, when the terminal device obtains the content of the RCS message from the RCS message content server, the terminal device verifies, by using the first authentication information and the second authentication information, whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information and the second authentication information, and does not need to perform login authentication in a manner such as by using an SMS message verification code or a user password. This simplifies operation steps of the terminal user, improves operation efficiency, and helps improve user experience.

In this embodiment of this disclosure, when the RCS message sending server determines that the terminal device is allowed to obtain the content of the RCS message, the RCS message content server may determine, as indicated by the access response message of the terminal device, that the terminal device is allowed to obtain the content of the RCS message from the RCS message content server, and the terminal user may experience the content, in the rich media form, in the RCS message. This helps improve user experience.

With reference to the first aspect, in some implementations of the first aspect, the method further includes that the RCS message sending server determines the content obtaining information of the RCS message based on the RCS message.

Optionally, the content obtaining information of the RCS message may be the RCS message.

Optionally, the RCS message sending server may generate a text in another self-defined format based on the RCS message, where the content obtaining information of the RCS message is the text in the another self-defined format, for example, a text in a JavaScript Object Notation (JSON) format.

Optionally, the RCS message sending server may generate a text in a Hypertext Markup Language (HTML) format based on the RCS message, where the content obtaining information of the RCS message is the text in the HTML format.

In this embodiment of this disclosure, a web page may be generated based on the content obtaining information of the RCS message. A result of presenting the web page on a browser (or a browser component) of a terminal device that does not support the RCS-type message is consistent with a result of presenting the RCS message on a terminal device that supports the RCS-type message, including a font, a color, a layout, and the like in the presented content. Therefore, the terminal device may obtain and present the content of the RCS message by using web page address information of the web page.

With reference to the first aspect, in some implementations of the first aspect, the first authentication information further identifies the content of the RCS message.

In this embodiment of this disclosure, the content of the target RCS message obtained by the terminal device from the RCS message content server may be determined by using the first authentication information.

With reference to the first aspect, in some implementations of the first aspect, that the RCS message sending server sends web page address information to the terminal device includes that the RCS message sending server sends a third message to the terminal device, where the third message includes the web page address information, and a content format of the third message is different from that of the RCS message.

In this embodiment of this disclosure, when the terminal device does not support an RCS-type message, the RCS message sending server may send the web page address information to the terminal device by using a message in a form other than that of the RCS message.

Optionally, the RCS message sending server may send an SMS message to the terminal device or send an MMS message to the terminal device, where the SMS message or the MMS message includes the web page address information.

Optionally, before that the RCS message sending server sends a third message to the terminal device, the method further includes that the RCS message sending server determines that the terminal device supports the third message.

It may be understood that the third message may be a message supported by the terminal device, to ensure that the terminal device can receive and parse the third message, and obtain the web page address information included in the third message.

With reference to the first aspect, in some implementations of the first aspect, the web page address information further includes identification information of the RCS message application server.

In this embodiment of this disclosure, if there are a plurality of RCS message application servers, the web page address information may further include the identification information of the RCS message application server, so that the target RCS message application server accessed by the terminal device through the RCS message content server may be determined based on the identification information of the RCS message application server.

With reference to the first aspect, in some implementations of the first aspect, the method further includes that the RCS message sending server receives an interaction request message sent by the RCS message content server, where the interaction request message includes the user identification information of the terminal device, and the interaction request message is used by the terminal device to perform service interaction with the RCS message application server; and the RCS message sending server sends the interaction request message to the RCS message application server.

In this embodiment of this disclosure, the RCS message sending server determines, based on the user identification information of the terminal device, the terminal user on which the login authentication succeeds, to send a related service interaction request message of the terminal user to the RCS message application server based on the interaction request message.

According to a second aspect, an information sending method is provided. The method includes that an RCS message content server receives a web page access request message sent by a terminal device, where the web page access request message includes web page address information, and the web page address information is used for obtaining content of an RCS message from the RCS message content server; and the RCS message content server returns the content of the RCS message to the terminal device based on the web page address information.

According to the information sending method provided in this embodiment of this disclosure, when the terminal device does not support an RCS-type message, the terminal device obtains, from the RCS message content server by using the web page address information, the content of the RCS message sent to a terminal user, and presents content, in a rich media form, in the RCS message. This helps improve user experience.

With reference to the second aspect, in some implementations of the second aspect, the web page address information includes address information of the RCS message content server and first authentication information, and the first authentication information is used for verifying whether the terminal device is allowed to obtain the content of the RCS message.

In this embodiment of this disclosure, when the terminal device obtains the content of the RCS message from the RCS message content server, the terminal device verifies, by using the first authentication information, whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information, and does not need to perform login authentication in a manner such as by using an SMS message verification code or a user password. This simplifies operation steps of the terminal user, improves operation efficiency, and helps improve user experience.

With reference to the second aspect, in some implementations of the second aspect, before the receiving a web page access request message sent by a terminal device, the method further includes that the RCS message content server receives a second message sent by an RCS message sending server, where the second message includes content obtaining information of the RCS message and user identification information of the terminal device, and the content obtaining information of the RCS message is used for obtaining the content of the RCS message; the RCS message content server generates the first authentication information; and the RCS message content server sends the first authentication information to the RCS message sending server.

It may be understood that, in this embodiment of this disclosure, when the terminal device does not support the RCS-type message, the RCS message sending server sends the RCS message to the RCS message content server, so that the terminal device may obtain the content of the RCS message from the RCS message content server, and the first authentication information is generated by the RCS message content server.

With reference to the second aspect, in some implementations of the second aspect, the method further includes that the RCS message content server determines that the terminal device is allowed to obtain the content of the RCS message.

With reference to the second aspect, in some implementations of the second aspect, the method further includes that the RCS message content server sends an access request message of the terminal device to an RCS message sending server, where the access request message of the terminal device includes second authentication information; and the RCS message content server receives an access response message that is of the terminal device and that is sent by the RCS message sending server, where the access response message of the terminal device indicates that the terminal device is allowed to obtain the content of the RCS message, where the access response message of the terminal device includes content obtaining information of the RCS message and user identification information of the terminal device.

In this embodiment of this disclosure, the RCS message sending server verifies, by using the first authentication information and the second authentication information, whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information and the second authentication information, and does not need to perform login authentication in a manner such as by using an SMS message verification code or a user password. This simplifies operation steps of the terminal user, improves operation efficiency, and helps improve user experience.

In this embodiment of this disclosure, when it is determined that the terminal device is allowed to obtain the content of the RCS message, the RCS message content server may determine, as indicated by the access response message, that the terminal device can obtain the content of the RCS message from the RCS message content server, so that the terminal user can experience the content, in the rich media form, in the RCS message. This helps improve user experience.

With reference to the second aspect, in some implementations of the second aspect, the first authentication information further identifies the content of the RCS message.

In this embodiment of this disclosure, the content of the target RCS message obtained by the terminal device from the RCS message content server may be determined by using the first authentication information.

With reference to the second aspect, in some implementations of the second aspect, the web page address information further includes identification information of an RCS message application server.

In this embodiment of this disclosure, if there are a plurality of RCS message application servers, the web page address information may further include the identification information of the RCS message application server, so that the target RCS message application server accessed by the terminal device through the RCS message content server may be determined based on the identification information of the RCS message application server.

With reference to the second aspect, in some implementations of the second aspect, the method further includes that the RCS message content server sends third authentication information to the terminal device, where the third authentication information indicates that web page access verification of the terminal device is valid.

It may be understood that, in this embodiment of this disclosure, after the terminal device performs login authentication on the RCS message content server, the RCS message content server sends the third authentication information to the terminal device, to indicate that the web page access verification of the terminal device is valid.

With reference to the second aspect, in some implementations of the second aspect, the method further includes that the RCS message content server receives an interaction request message sent by the terminal device, where the interaction request message includes the third authentication information, and the interaction request message is used by the terminal device to perform service interaction with the RCS message application server; the RCS message content server determines, based on the third authentication information, that the web page access verification of the terminal device is valid; and the RCS message content server sends the interaction request message to the RCS message sending server, where the interaction request message includes the user identification information of the terminal device.

In this embodiment of this disclosure, when the terminal device performs a service request operation on a web page corresponding to the content of the RCS message, the RCS message content server may determine, based on the third authentication information, that the terminal device is allowed to perform service interaction with the RCS message application server by using the web page corresponding to the content of the RCS message, to directly send the interaction request message and the user identification information of the terminal device to the RCS message application server, to implement service interaction between the RCS message application server and the terminal device.

According to a third aspect, an information sending method is provided. The method is applied to a terminal device, the terminal device does not support an RCS-type message, and the method includes that the terminal device receives web page address information sent by an RCS message sending server, where the web page address information is used for obtaining content of an RCS message from an RCS message content server; and the terminal device obtains the content of the RCS message from the RCS message content server based on the web page address information.

According to the information sending method provided in this embodiment of this disclosure, when the terminal device does not support the RCS-type message, the terminal device obtains, from the RCS message content server by using the web page address information, the content of the RCS message sent to a terminal user, and presents content, in a rich media form, in the RCS message. This helps improve user experience.

With reference to the third aspect, in some implementations of the third aspect, the web page address information includes address information of the RCS message content server and first authentication information, and the first authentication information is used for verifying whether the terminal device is allowed to obtain the content of the RCS message.

In this embodiment of this disclosure, when the terminal device obtains the content of the RCS message from the RCS message content server, the terminal device verifies, by using the first authentication information, whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information, and does not need to perform login authentication in a manner such as by using an SMS message verification code or a user password. This simplifies operation steps of the terminal user, improves operation efficiency, and helps improve user experience.

With reference to the third aspect, in some implementations of the third aspect, the first authentication information further identifies the content of the RCS message.

In this embodiment of this disclosure, the content of the target RCS message obtained by the terminal device from the RCS message content server may be determined by using the first authentication information.

With reference to the third aspect, in some implementations of the third aspect, the web page address information further includes identification information of an RCS message application server.

In this embodiment of this disclosure, if there are a plurality of RCS message application servers, the web page address information may further include the identification information of the RCS message application server, so that the target RCS message application server accessed by the terminal device through the RCS message content server may be determined based on the identification information of the RCS message application server.

With reference to the third aspect, in some implementations of the third aspect, that the terminal device receives web page address information sent by an RCS message sending server includes that the terminal device receives a third message sent by the RCS message sending server, where the third message includes the web page address information, and a content format of the third message is different from that of the RCS message.

In this embodiment of this disclosure, when the terminal device does not support the RCS-type message, the RCS message sending server may send the web page address information to the terminal device by using a message in another form.

Optionally, the RCS message sending server may send an SMS message or an MMS message to the terminal device, where the SMS message or the MMS message includes the web page address information.

With reference to the third aspect, in some implementations of the third aspect, that the terminal device obtains the content of the RCS message from the RCS message content server based on the web page address information includes that the terminal device sends a web page access request message to the RCS message content server based on the web page address information; and the terminal device receives the content that is of the RCS message and that is returned by the RCS message content server.

In this embodiment of this disclosure, when the terminal device does not support the RCS-type message, the terminal device sends the web page access request message to the RCS message content server by using the web page address information, to obtain the content of the RCS message from the RCS message content server.

With reference to the third aspect, in some implementations of the third aspect, the method further includes that the terminal device receives third authentication information sent by the RCS message content server, where the third authentication information indicates that web page access verification of the terminal device is valid; and the terminal device sends an interaction request message to the RCS message content server, where the interaction request message includes the third authentication information, and the interaction request message is used by the terminal device to perform service interaction with the RCS message application server.

In this embodiment of this disclosure, when the terminal device performs a service request operation on a web page corresponding to the content of the RCS message, the RCS message content server may determine, based on the third authentication information, that the terminal device is allowed to perform service interaction with the RCS message application server by using the web page corresponding to the content of the RCS message, to directly send the interaction request message and the user identification information of the terminal device to the RCS message application server, to implement service interaction between the RCS message application server and the terminal device.

According to a fourth aspect, an information sending apparatus is provided. The apparatus includes a receiving unit, configured to receive a first message sent by an RCS message application server, where the first message includes an RCS message and user identification information of a terminal device; a processing unit, configured to determine that the terminal device does not support an RCS-type message; and a sending unit, configured to send web page address information to the terminal device, where the web page address information is used for obtaining content of the RCS message from an RCS message content server.

With reference to the fourth aspect, in some implementations of the fourth aspect, the web page address information includes address information of the RCS message content server and first authentication information, and the first authentication information is used for verifying whether the terminal device is allowed to obtain the content of the RCS message.

With reference to the fourth aspect, in some implementations of the fourth aspect, before the sending unit is configured to send the web page address information to the terminal device, the sending unit is further configured to send a second message to the RCS message content server, where the second message includes content obtaining information of the RCS message and the user identification information of the terminal device; and the receiving unit is further configured to receive, from the RCS message content server, the first authentication information generated by the RCS message content server.

With reference to the fourth aspect, in some implementations of the fourth aspect, the receiving unit is further configured to receive an access request message that is of the terminal device and that is sent by the RCS message content server, where the access request message of the terminal device includes second authentication information; and the processing unit is further configured to determine, based on the first authentication information and the second authentication information, that the terminal device is allowed to obtain the content of the RCS message.

With reference to the fourth aspect, in some implementations of the fourth aspect, the sending unit is further configured to send an access response message of the terminal device to the RCS message content server, where the access response message of the terminal device indicates that the terminal device is allowed to obtain the content of the RCS message, and the access response message of the terminal device includes the content obtaining information of the RCS message and the user identification information of the terminal device.

With reference to the fourth aspect, in some implementations of the fourth aspect, the first authentication information further identifies the content of the RCS message.

With reference to the fourth aspect, in some implementations of the fourth aspect, that a sending unit is configured to send web page address information to the terminal device includes the sending unit is configured to send a third message to the terminal device, where the third message includes the web page address information, and a content format of the third message is different from that of the RCS message.

With reference to the fourth aspect, in some implementations of the fourth aspect, the web page address information further includes identification information of the RCS message application server.

With reference to the fourth aspect, in some implementations of the fourth aspect, the receiving unit is further configured to receive an interaction request message sent by the RCS message content server, where the interaction request message includes the user identification information of the terminal device, and the interaction request message is used by the terminal device to perform service interaction with the RCS message application server; and the sending unit is further configured to send the interaction request message to the RCS message application server.

According to a fifth aspect, an information sending apparatus is provided. The apparatus includes a receiving unit, configured to receive a web page access request message sent by a terminal device, where the web page access request message includes web page address information, and the web page address information is used for obtaining content of an RCS message from the apparatus; and a sending unit, configured to return the content of the RCS message to the terminal device based on the web page address information.

With reference to the fifth aspect, in some implementations of the fifth aspect, the web page address information includes address information of the apparatus and first authentication information, and the first authentication information is used for verifying whether the terminal device is allowed to obtain the content of the RCS message.

With reference to the fifth aspect, in some implementations of the fifth aspect, before the receiving unit is configured to receive the web page access request message sent by the terminal device, the receiving unit is further configured to receive a second message sent by an RCS message sending server, where the second message includes content obtaining information of the RCS message and user identification information of the terminal device; the processing unit is configured to generate the first authentication information; and the sending unit is further configured to send the first authentication information to the RCS message sending server.

With reference to the fifth aspect, in some implementations of the fifth aspect, the processing unit is further configured to determine, based on the first authentication information, that the terminal device is allowed to obtain the content of the RCS message.

With reference to the fifth aspect, in some implementations of the fifth aspect, the sending unit is further configured to send an access request message of the terminal device to the RCS message sending server, where the access request message of the terminal device includes second authentication information; and the receiving unit is further configured to receive an access response message that is of the terminal device and that is sent by the RCS message sending server, where the access response message of the terminal device indicates that the terminal device is allowed to obtain the content of the RCS message, and the access response message of the terminal device includes the content obtaining information of the RCS message and the user identification information of the terminal device.

With reference to the fifth aspect, in some implementations of the fifth aspect, the first authentication information is further used for determining the content of the RCS message.

With reference to the fifth aspect, in some implementations of the fifth aspect, the web page address information further includes identification information of an RCS message application server.

With reference to the fifth aspect, in some implementations of the fifth aspect, the sending unit is further configured to send third authentication information to the terminal device, where the third authentication information indicates that web page access verification of the terminal device is valid.

With reference to the fifth aspect, in some implementations of the fifth aspect, the receiving unit is further configured to receive an interaction request message sent by the terminal device, where the interaction request message includes the third authentication information, and the interaction request message is used by the terminal device to perform service interaction with the RCS message application server; the processing unit is further configured to determine, based on the third authentication information, that the web page access verification of the terminal device is valid; and the sending unit is further configured to send the interaction request message to the RCS message sending server, where the interaction request message includes the user identification information of the terminal device.

According to a sixth aspect, an information sending apparatus is provided. The apparatus does not support an RCS-type message, and the apparatus includes a receiving unit, configured to receive web page address information sent by an RCS message sending server, where the web page address information is used for obtaining content of an RCS message from an RCS message content server, where the receiving unit is configured to obtain the content of the RCS message from the RCS message content server based on the web page address information.

With reference to the sixth aspect, in some implementations of the sixth aspect, the sending unit is further configured to send a web page access request message to the RCS message content server according to the web address information; and the receiving unit is further configured to receive the content that is of the RCS message and that is returned by the RCS message content server.

With reference to the sixth aspect, in some implementations of the sixth aspect, the web page address information includes address information of the RCS message content server and first authentication information, and the first authentication information is used for verifying whether the apparatus is allowed to obtain the content of the RCS message.

With reference to the sixth aspect, in some implementations of the sixth aspect, the first authentication information is further used for determining the content of the RCS message.

With reference to the sixth aspect, in some implementations of the sixth aspect, the web page address information further includes identification information of an RCS message application server.

With reference to the sixth aspect, in some implementations of the sixth aspect, that a receiving unit is configured to receive web page address information sent by an RCS message sending server include that the receiving unit receives a third message sent by the RCS message sending server, where the third message includes the web page address information, and a content format of the third message is different from that of the RCS message.

With reference to the sixth aspect, in some implementations of the sixth aspect, the receiving unit is further configured to receive third authentication information sent by the RCS message content server, where the third authentication information indicates that web page access verification of the apparatus is valid; and the sending unit is further configured to send an interaction request message to the RCS message content server, where the interaction request message includes the third authentication information, and the interaction request message is used by the apparatus to perform service interaction with the RCS message application server.

According to a seventh aspect, an apparatus is provided. The apparatus includes a processor, the processor is coupled to a memory, and the memory is configured to store a program or instructions. When the program is executed or the instructions are executed by the processor, the apparatus is enabled to perform the method in any possible implementations of the first aspect, the second aspect, or the third aspect.

According to an eighth aspect, a communication system is provided. The communication system includes the apparatus provided in the fourth aspect, the apparatus provided in the fifth aspect, and the apparatus provided in the sixth aspect.

According to a ninth aspect, a computer-readable storage medium is provided. The computer-readable storage medium stores instructions. When the instructions are run, a computer is enabled to perform the method in any possible implementation of the first aspect, the second aspect, or the third aspect.

According to a tenth aspect, a computer program product is provided. When the computer program product runs on a computer, the computer is enabled to perform the method in any possible implementation of the first aspect, the second aspect, or the third aspect.

According to an eleventh aspect, a communication chip is provided. The communication chip stores instructions. When the instructions are run on a network device, the communication chip is enabled to perform the method in any possible implementation of the first aspect, the second aspect, or the third aspect.

DESCRIPTION OF EMBODIMENTS

Figure 1:
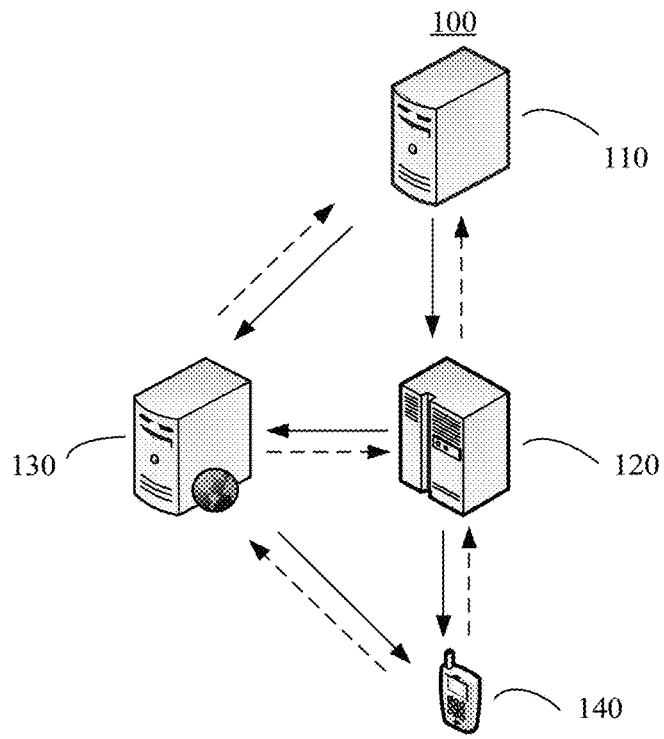
FIG. 1 is a diagram of an example of a communication system according to an embodiment of this disclosure.

The following describes technical solutions of embodiments in this disclosure with reference to accompanying drawings.

To facilitate understanding of the technical solutions in this disclosure, some technologies in this disclosure are first briefly described.

1. Rcs Message:

An RCS message, also referred to as a 5G message or a rich media message, complies with the "Rich Communication Suit-Advanced Communications Services and Client Specification," Version 11.0, Oct. 16, 2019 ("RCC.07") and the "RCS Universal Profile Service Definition Document," Version 2.4, Oct. 16, 2019 ("RCC.71), both of which are incorporated by reference, which are released by the Global System for Mobile Communications Association (GSMA). The RCS message is an upgrade of a traditional SMS message. According to the internet protocol technology, the RCS message implements a leap in service experience, supports more media formats, and has more representation forms.

The RCS message provides point-to-point message and group chat services for terminal users. In addition to texts, content of the RCS message may further support various forms such as pictures, audio, videos, locations, and contacts. The RCS message provides an enhanced individual-to-application messaging service for industry customers, to implement "message as a service". In addition, a new message interaction mode, namely, a chatbot is introduced, to connect to a terminal in a message dialog mode, and search, discovery, interaction, and payment services can be provided in a dialog box. In this way, an interaction service between an industry customer such as an enterprise and a terminal user is implemented.

It should be noted that, in embodiments of this disclosure, content of the RCS message may be understood as content, in a rich media form, included in the RCS message, for example, text content, picture content, video content, audio content, or card content, and an arrangement sequence and function exchange of the foregoing content.

2. Rcs Client:

RCS clients may be classified into RCS embedded clients and RCS downloadable clients.

The RCS embedded client is a client provided as a part of implementation of a terminal device (such as a mobile phone). The RCS embedded client may be integrated with a local application of the terminal device, such as an address book, a file browser, or a call application (namely, a telephone service).

The RCS downloadable client is a client that can provide its own internet protocol multimedia subsystem (IMS) connection. The RCS downloadable client may be pre-installed in a terminal, or may be downloaded and installed in a terminal by a user. However, the RCS downloadable client is not a part of basic software of the terminal, to be specific, the RCS downloadable client does not have functions of accessing an application programming interface (API) and an advanced operating system (OS) inside the terminal. The RCS downloadable client may further be integrated with a local application (such as an address book or a file browser) of the terminal. However, a degree of integration between the RCS downloadable client and the local application of the terminal is limited only to a degree allowed by an OS platform or an API of the terminal.

3. Message Downgrade:

Message downgrade is a process of converting an RCS message to a message in another form when a terminal device of a user does not support the RCS message.

It may be understood that a content format of the message in the another form is different from that of the RCS message. For example, the message in the another form may include only content in a text format or content in a video format. For example, the message in the another form may be an SMS message or an MMS message.

It should be noted that, in embodiments of this disclosure, that the terminal device does not support the RCS message may be understood as that the terminal device cannot directly receive and parse the RCS message, and as a result, the terminal device cannot present content, in a rich media form, in the RCS message.

The technical solutions of embodiments of this disclosure may be applied to various communication systems, such as a Global System for Mobile Communications (GSM) system, a code-division multiple access (CDMA) system, a wideband code-division multiple access (WCDMA) system, a general packet radio service (GPRS) system, a Long-Term Evolution (LTE) system, an LTE frequency-division duplex (FDD) system, an LTE time-division duplex (TDD) system, a universal mobile telecommunications system (UMTS), a Worldwide Interoperability for Microwave Access (WiMAX) communication system, a future 5th generation (5G) system, or a new radio (NR) system.

FIG. 1 shows a communication system 100 applicable to an embodiment of this disclosure. The communication system 100 includes an RCS message application server 110, an RCS message sending server 120, an RCS message content server 130, and a terminal device 140. In the communication system 100, the RCS message application server 110 may be separately in communication connection with the RCS message sending server 120 and the RCS message content server 130. In addition, the terminal device 140 may further be separately in communication connection with the RCS message sending server 120 and the RCS message content server 130.

The RCS message application server 110 may be an application platform provided by an industry customer in an RCS message service, for example, a chatbot (namely, an enterprise server), and main functions of the RCS message application server include receiving, sending, and processing messages exchanged with individual users, to provide a service presented in a dialog form for the terminal device 140.

The RCS message sending server 120 may be a server provided by an operator or an agent and located between the RCS message application server 110 and the terminal device 140. Main functions of the RCS message sending server 120 include receiving and sending messages between the RCS message application server 110 and the terminal device 140, and implementing service interaction between the RCS message application server 110 and the terminal device 140. For example, the RCS message sending server 120 may be a 5G message center (5GMC) provided by an operator, a message as a platform (MAAP), a chatbot service platform (CSP, which is a service platform deployed on a cloud), or may be an aggregation server provided by an agent.

The RCS message content server 130 may be a web server, and is mainly configured to configure and store a display web page whose content is consistent with content of an RCS message. The terminal device 140 obtains the content of the RCS message from the RCS message content server, and a web page interface of the terminal device 140 presents the content of the RCS message. In addition, an individual user may further implement service interaction with the RCS message application server 110 by performing user operations on the web page interface.

The terminal device 140 may be user equipment (UE), an access terminal device, a subscriber unit, a subscriber station, a mobile station, a remote station, a remote terminal device, a mobile device, a user terminal device, a terminal device, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, a terminal device in a future evolved public land mobile network (PLMN), or the like. This is not limited in embodiments of this disclosure.

In embodiments of this disclosure, the terminal device or the server includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in embodiments of this disclosure is not specifically limited in embodiments of this disclosure, provided that a program that records code of the method provided in embodiments of this disclosure can be run to perform communication according to the method provided in embodiments of this disclosure. For example, the method provided in embodiments of this disclosure may be performed by a terminal device or a server, or a functional module that is in the terminal device or the server and that can invoke and execute the program.

In addition, aspects or features of this disclosure may be implemented as a method, an apparatus, or a product that uses standard programming and/or engineering technologies. The term "product" used in this disclosure covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

It should be noted that the communication system 100 shown in FIG. 1 is only intended to describe the technical solutions of this disclosure more clearly, but is not intended to limit this disclosure. A person of ordinary skill in the art may know that as a network architecture evolves and a new service scenario emerges, the technical solutions provided in this disclosure are also applicable to a similar technical problem.

As shown in FIG. 1, the RCS message application server 110 may send an RCS message to the terminal device 140 through the RCS message sending server 120. The RCS message sending server 120 may determine whether the terminal device 140 of a user that receives the RCS message supports an RCS message service. If the RCS message sending server 120 determines that the terminal device 140 supports the RCS message, the RCS message sending server 120 may send, to the terminal device 140, the RCS message sent by the RCS message application server 110. A message interface of the terminal device 140 displays content of the RCS message, for example, audio, videos, locations, and interactive card content, and the user may perform a user operation on the message interface displayed by the terminal device 140 to implement service interaction with the RCS message application server 110.

If the RCS message sending server 120 determines that the terminal device 140 does not support the RCS message, the RCS message sending server 120 may degrade the RCS message sent by the RCS message application server 110 to a message in another form supported by the terminal device 140. For example, the RCS message sending server 120 may degrade the RCS message to an SMS message or an MMS message, and then send the SMS message or the MMS message to the terminal device 140. In this case, the message interface of the terminal device 140 can display only content of the SMS message or the MMS message, and cannot present original content, in a rich media form, in the RCS message, and the user cannot experience the content, in the enriched rich media form, in the RCS message. In addition, the user cannot implement service interaction with the RCS message application server by using an SMS message or an MMS message. This is unfavorable to user experience.

In addition, when the terminal device 140 accesses a web page provided by the RCS message content server 130, the terminal device 140 needs to perform login authentication of an individual user before accessing a specific page. For example, the terminal device 140 needs to perform login authentication of an individual user in a manner such as by using an SMS message verification code or a user password. This operation step is complex and is unfavorable to user experience.

To resolve the foregoing problem, this disclosure provides an information sending method. The following specifically describes the information sending method in embodiments of this disclosure with reference to FIG. 2 to FIG. 4.

Figure 2:
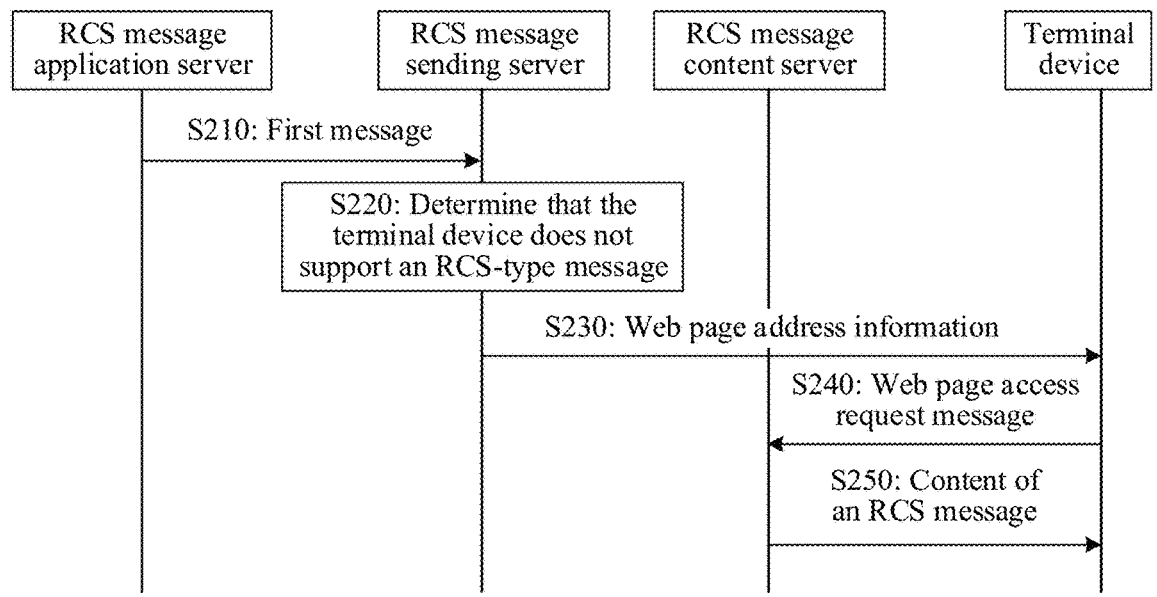
FIG. 2 is a schematic flowchart of an information sending method according to an embodiment of this disclosure.

FIG. 2 is a schematic flowchart of an information sending method 200 according to an embodiment of this disclosure. It may be understood that FIG. 2 shows steps or operations of the information sending method. However, these steps or operations are merely examples. In this embodiment of this disclosure, other operations or variations of the operations in FIG. 2 may be further performed. In addition, the steps in FIG. 2 may be performed in a sequence different from a sequence shown in FIG. 2, and it is possible that not all operations in FIG. 2 need to be performed.

S210: An RCS message application server sends a first message to an RCS message sending server, where the first message includes an RCS message and user identification information of a terminal device.

It may be understood that the user identification information of the terminal device may be used for determining a target terminal user that receives the first message. Optionally, the user identification information of the terminal device may be a mobile subscriber integrated services digital network (MSISDN) number, or may be an international mobile subscriber identity (IMSI) number. This is not limited in this disclosure.

Optionally, if there are a plurality of RCS message application servers, the first message may further include identification information of the RCS message application server.

Optionally, before the RCS message application server sends the first message to the RCS message sending server, the method 200 further includes that the RCS message application server registers with the RCS message sending server, where registration content may include feature information of a common page displayed by the RCS message application server in a message window, for example, may include an application name, a flag, and configuration information of a bottom menu of the RCS message application server. The message window may be a message window interface displayed by the terminal device, and the user performs an operation on the window interface to implement interaction with the RCS message application server.

Optionally, the RCS message sending server may send the registration content to the RCS message content server. For example, the RCS message sending server may send, to the RCS message content server, the feature information of the common page displayed by the RCS message application server in the message window.

Optionally, after the RCS message application server registers with the RCS message sending server, the method 200 further includes that the RCS message sending server determines the identification information of the RCS message application server, and sends the identification information of the RCS message application server to the RCS message application server. The identification information of the RCS message application server corresponds one-to-one to the RCS message application server.

S220: The RCS message sending server determines that the terminal device does not support an RCS-type message.

It may be understood that the RCS-type message is a general term for messages that comply with RCC.07 (and its compatible version) and RCC.71 that are released by the global system for GSMA, instead of indicating a specific RCS message.

It may be understood that the RCS message sending server may determine whether the terminal device of the user supports the RCS-type message depending on whether an RCS client corresponding to the RCS message application server is installed on the terminal device of the user.

In a possible case, no RCS client is installed on the terminal device of the user, and the RCS message sending server determines that the terminal device does not support the RCS-type message. To be specific, when no RCS client is installed on the terminal device of the user, the terminal device cannot register with the RCS message sending server by using the RCS client, where registration content stored in the RCS message sending server does not contain information about the terminal device nor the user identification information of the terminal device. After receiving the first message sent by the RCS message application server, the RCS message sending server cannot find, in the stored registration content, the user identification information of the terminal device and the corresponding information about terminal device that are included in the first message. In addition, when no RCS client is installed on the terminal device of the user, the terminal device cannot receive and parse RCS messages, and therefore cannot present content of the RCS message. The RCS message sending server determines that the terminal device of the user does not support the RCS-type message.

In another possible case, an RCS client is installed on the terminal device of the user, and the RCS message sending server determines that the terminal device supports the RCS-type message. To be specific, when the RCS client is installed on the terminal device of the user, the terminal device of the user may register with the RCS message sending server by using the RCS client, where registration content may include the information about the terminal device and the user identification information of the terminal device, and the RCS message sending server stores the registration content. After receiving the first message sent by the RCS message application server, the RCS message sending server may find, in the stored registration content, the user identification information of the terminal device and the corresponding information about the terminal device that are included in the first message. In addition, when the RCS client is installed on the terminal device of the user, the terminal device may receive and parse the RCS message, to present content, in a rich media form, in the RCS message. The RCS message sending server determines that the terminal device of the user supports the RCS-type message.

It may be understood that the foregoing embodiment in which the RCS message sending server determines whether the terminal device supports the RCS-type message is merely intended to help a person skilled in the art better understand the technical solution of this disclosure, but not to limit this disclosure.

If the RCS message sending server determines that the terminal device of the user supports the RCS-type message, the RCS message sending server may directly send, to the terminal device, the RCS message sent by the RCS message application server, without performing the following steps.

If the RCS message sending server determines that the terminal device of the user does not support the RCS-type message, the following steps continue to be performed.

S230: The RCS message sending server sends web page address information to the terminal device, where the web page address information is used for obtaining the content of the RCS message from the RCS message content server.

Specifically, when the RCS message sending server determines that the terminal device does not support the RCS-type message, the RCS message sending server may send content obtaining information of the RCS message to the RCS message content server, where the content obtaining information of the RCS message is used for obtaining the content of the RCS message. The RCS message sending server may generate the web page address information, and subsequently the terminal device may obtain the content of the RCS message from the RCS message content server by using the web page address information.

Optionally, the method 200 may further include that the RCS message sending server determines the content obtaining information of the RCS message based on the RCS message.

For example, the content obtaining information of the RCS message may be the RCS message.

Alternatively, the RCS message sending server may generate a text in another self-defined format based on the RCS message, where the content obtaining information of the RCS message may be the text in the another self-defined format, for example, a text in a JSON format.

Alternatively, the RCS message sending server may directly generate, based on an HTML 5.0 technology configuration, a web page corresponding to the content of the RCS message, that is, the RCS message sending server may generate a text in an HTML format based on the RCS message, where the content obtaining information of the RCS message may be the text in the HTML format.

In a possible case, when the content obtaining information of the RCS message is the RCS message or a text in another self-defined format (for example, a text in a JSON format), after receiving the content obtaining information of the RCS message, the RCS message content server may immediately generate, based on the content obtaining information of the RCS message, a web page corresponding to the content of the RCS message, and store the web page. When the terminal device requests the content of the RCS message based on web page address information, the RCS message content server directly returns content of the web page to the terminal device, or stores the content obtaining information of the RCS message (the web page is not generated based on the content obtaining information of the RCS message temporarily). When the terminal device requests the content of the RCS message based on the web page address information, the RCS message content server generates a web page based on the stored content obtaining information of the RCS message, and returns the generated web page to the terminal device. The former web page generated in advance is referred to as a static web page, and the latter temporarily generated web page is referred to as a dynamic web page. It may be understood that, to improve user experience, a result of presenting the generated web page on a browser (or a browser component) of a terminal device that does not support the RCS-type message is consistent with a result of presenting the RCS message on a terminal device that supports the RCS-type message, including a font, a color, a layout, and the like in presented content.

For example, the RCS message content server may alternatively generate a web page based on the HTML5.0 technology configuration, that is, the RCS message content server may generate a text in an HTML format based on the obtaining information of the RCS message. This is not limited in this disclosure. The terminal device of the user may access the RCS message content server by using the web page address information, and obtain the content of the RCS message.

In another possible case, when the RCS message sending server directly generates a web page, that is, when the content obtaining information of the RCS message is a text in the HTML format, after receiving the content obtaining information of the RCS message, the RCS message content server may store the text in the HTML format, that is, store the web page. When the terminal device requests the content of the RCS message based on web page address information, content of the web page is directly returned to the terminal device. Similarly, a result of presenting the web page on a browser (or a browser component) of a terminal device that does not support the RCS-type message is consistent with a result of presenting the RCS message on a terminal device that supports the RCS-type message, including a font, a color, a layout, and the like in presented content.

It may be understood that the content of the RCS message may be content, in a rich media form, included in the RCS message, for example, text content, picture content, video content, audio content, or card content, and an arrangement sequence and function exchange of the content. This is not limited in this disclosure. For example, the card content may include a media material, a title, a button, and a floating menu.

In a possible case, the content of the RCS message is directly obtained by using the web page address information, and the content of the RCS message of the terminal user may be obtained by another user. This causes leakage of the content of the RCS message of the terminal user and causes a security problem. In addition, when the terminal user obtains the content of the RCS message by using the web page address information, the terminal user first needs to perform a login authentication operation in a manner such as entering an SMS message verification code or a user password.

In view of the foregoing problem, the web page address information may include address information of the RCS message content server and first authentication information, where the first authentication information is used for verifying whether the terminal device is allowed to obtain the content of the RCS message.

In this embodiment of this disclosure, the first authentication information is used for verifying whether the terminal device is allowed to obtain the content of the RCS message, to ensure that the content of the RCS message of the terminal user is not leaked and satisfies a security requirement; in addition, the terminal user may obtain the content of the RCS message through the verification by using the first authentication information, and does not need to perform login authentication in a manner such as an SMS message verification code or a user password. This simplifies operation steps of the terminal user, improves operation efficiency, and helps improve user experience.

Optionally, the web page address information may include identification information of the content of the RCS message, and the RCS message content server may determine, based on the identification information of the content of the RCS message, the content that is of the RCS message and that is obtained by the terminal device.

The identification information of the content of the RCS message may be preconfigured, or may be the first authentication information. This is not limited in this disclosure.

For example, the web page address information may be a uniform resource locator (URL).

For example, the web page address information may be address information of a static web page, for example, the following example (1); or may be address information of a dynamic web page, for example, the following example (2).
Example 1: http://xxx.xxx. xxx.xxx/13579.html?token=asdf
Example 2: http://xxx.xxx.xxx.xxx/retrieve.do?rcs-content-id=13579&token=asdf Optionally, the web page address information may be generated by the RCS message sending server; or may be generated by another server and then sent to the RCS message sending server.

For example, the RCS message sending server may combine the address information of the RCS message content server and the first authentication information to generate a URL.

Optionally, if there are a plurality of RCS message application servers, the web page address information may further include the identification information of the RCS message application server, so that the target RCS message application server accessed by the terminal device through the RCS message content server may be determined based on the identification information of the RCS message application server.

Optionally, the first authentication information may be generated by the RCS message sending server, may be generated by the RCS message content server, or may be generated by a third-party server. It may be understood that the third-party server may be a server other than the RCS message sending server and the RCS message content server. For example, the first authentication information may be generated by an authentication server.

It may be understood that the foregoing embodiment of generating the first authentication information is merely intended to help a person skilled in the art better understand the technical solutions of this disclosure, but is not intended to limit this disclosure. This is not limited in this disclosure.

Optionally, the address information of the RCS message content server may be preconfigured by the RCS message sending server; or may be preconfigured by a third-party server and then sent to the RCS message sending server. This is not limited in this disclosure. For example, the address information of the RCS message content server may be a domain name of the RCS message content server.

Optionally, the RCS message sending server may send a third message to the terminal device, where the third message includes the web page address information, and a content format of the third message is different from that of the RCS message.

It may be understood that the third message may be a message in a form other than the RCS message. For example, the third message may be an SMS message or an MMS message. The foregoing embodiments are merely intended to help a person skilled in the art better understand the technical solutions of this disclosure, but are not intended to limit this disclosure.

Optionally, before the RCS message sending server sends the third message to the terminal device, the method 200 further includes that the RCS message sending server determines that the terminal device supports the third message.

It may be understood that, that the terminal device supports the third message may mean that the terminal device may receive and parse the third message, and present content of the third message.

Optionally, the terminal device may receive the third message by using a message application installed on the terminal device.

S240: The RCS message content server receives a web page access request message sent by the terminal device, where the web page access request message includes the web page address information.

The terminal device may send the web page access request message to the RCS message content server based on the web page address information, to request to obtain the web page that corresponds to the content of the RCS message and that is stored in the RCS message content server.

For example, the user may click the web page address information received on the terminal device, to trigger the terminal device to send the web page access request message to the RCS message content server corresponding to the web page address information.

For example, the terminal device may receive the third message by using an installed message application, the user taps the web page address information on a message application interface, and a display interface of the terminal device may jump from the message application interface to a mobile phone browser interface, to trigger generation of the web page access request message.

S250: The RCS message content server returns the content of the RCS message to the terminal device based on the web page address information.

Specifically, after receiving the web page access request message, the RCS message content server may determine, based on the first authentication information included in the web page address information, that the terminal device is allowed to obtain the content of the RCS message, and the RCS message content server returns the content of the RCS message to the terminal device.

For example, after it is determined that the terminal device is allowed to obtain the content of the RCS message, the terminal device may load the web page corresponding to the content of the RCS message by using an installed browser, where a result presented on the web page is consistent with a result of presenting the RCS message on a terminal device that supports the RCS-type message.

The following uses a sample of the first message as an example for description.

For example, the first message sent by the RCS message application server to the RCS message sending server may be an HTTP message, as shown below:

```
POST /openchatbot/v2/123456/outbound HTTP/1.1
Authorization:Username="a20a9716-8577-4e5e-8333-490df5b72e9f",
Password="abcd1234"
Content-Type: application/json
Accept: */*
Host: 10.186.76.175:8323
accept-encoding: gzip, deflate
content-length: 1881
Connection: keep-alive
{ "clientCorrelator":"567895",
"senderAddress":"sip:471400.huawei@botplatform.rcs.chinamobile.com",
"address":"sip:+8613911111018@ims.mnc000.mcc460.3gppnetwork.org",
"destinationAddress":"sip:+8613911111018@ims.mnc000.mcc460.3gppnetwork.org",
"outboundIMMessage":{
"bodyText":"<![CDATA[--
next\r\nConteType:application/vnd.gsma.botmessage.v1.0+jso         n\r\nTransfer-
Encoding:chunked\r\n\r\n{\"message\":{\"generalPurposeCardCarousel\":{\"
layout\":{\"cardOrientation\":\"VERTICAL\",\"imageAlignment\":\"LEFT\",\"titleFontStyle\":[\"
underline\",\"bold\"],\"descriptionFontStyle\":[\"calibri\"]},\"content\":[{\"media\":{ \"mediaUrl\
":\"http://10.243.50.178:9090/Access/PF?ID=Q0Q5QjAxRUUINDBFRDUxQUQ5RkFFOTY0
RjQ3MjM4NjBGQKM2NDFDNzQ2OTBCMENBOUJDRj1BRUE3Q0U0NDA5NTA3QkQ4M0
UxNzM4NzlERTJCQzMxNEM5QUFDRDg2Nzg1\",\"mediaContentType\":\"image/png\",\"thu
mbnailUrl\":\"http://10.243.50.178:9090/Access/PF?ID=MKE2REU4QTQ2RjU4OEJBQjNBND
g3Q0ZCRUI0NUVBQzUxQUU1MkE5QjY0MDFCN0U5NkYwMzNFQjc5MjJGRDlGOEYxO
TUwQjc5QUREQUFCRKY5ODBERUQ2ODMwNjEwOTY1\",\"thumbnailContentType\":\"im
age/png\",\"height\":\"MEDIUM_HEIGHT\",\"contentDescription":"Renminzhiyun
webview1\"},\"title\":\"1\",\"description\":\"Panoramic Palace Museum\"}]}}}\r\n--next--]]>\r\n"
   "destination Terminal":"Native",
   "messageId":"5eae954c-42ca-4181-9ab4-9c0ef2e9v841",
   "imFormat":"IM",
   "contentType":"multipart/mixed; boundary=\"next\"",
   "serviceCapability":[{"capabilityId":"ChatbotSA",
   "version":"+g.gsma.rcs.botversion=\"#=1\""}]
}
```

The RCS message included in the first message may be understood as information in the "bodyText" field, to be specific, the RCS message may be:

```
"<![CDATA[--next\r\nConteType:application/vnd.gsma.botmessage.v1.0+jso
n\r\n Transfer-Encoding:chunked\r\n\r\n{\"message\": {\"generalPurposeCardCarousel\":{\"
layout\":{\"cardOrientation\":\"VERTICAL\",\"imageAlignment\":\"LEFT\",\"titleFontStyle\":
[\"
underline\",\"bold\"],\"descriptionFontStyle\":[\"calibri\"},\"content\":[{\"media\":{ \"mediaUrl\
":\"http://10.243.50.178:9090/Access/PF?ID=Q0Q5QjAxRUUINDBFRDUxQUQ5RkFFOTY0
RjQ3MjM4NjBGQKM2NDFDNzQ2OTBCMENBOUJDRjlBRUE3Q0U0NDA5NTA3QkQ4M0
UxNzM4NzlERTJCQzMxNEM5QUFDRDg2Nzg1\",\"mediaContentType\":\"image/png\",\"thu
mbnailUrl\":\"http://10.243.50.178:9090/Access/PF?ID=MKE2REU4QTQ2RjU4OEJBQjNBND
g3Q0ZCRUI0NUVBQzUxQUU1MkE5QjY0MDFCN0U5NkYwMzNFQjc5MjJGRDlGOEYxO
TUwQjc5QUREQUFCRKY5ODBERUQ2ODMwNjEwOTY1\",\"thumbnailContentType\":\"im
age/png\",\"height\":\"MEDIUM_HEIGHT\",\"contentDescription\"Renminzhiyun
webview1\"},\"title\":\"1\",\"description\":\"Panoramic Palace Museum\"}]}}}\r\n--next--]]
>\r\n"
```

The content of the RCS message may be understood as content, in a rich media form, obtained by parsing the character string included in the "bodyText", for example, audio, a video, a text, a picture, and a button.

For example, when the terminal device does not support the RCS-type message, in a possible case, the content obtaining information of the RCS message may be the character string included in the "bodyText". The RCS message sending server may send the character string to the RCS message content server. The RCS message content server may generate an HTML text based on the character string.

In another possible case, the content obtaining information of the RCS message may be a text, in the HTML format, generated based on the character string included in the "bodyText". To be specific, the RCS message sending server may generate the text in the HTML format based on the character string, and send the text in the HTML format to the RCS message content server. The RCS message content server may store the text in the HTML format.

In another possible case, the content obtaining information of the RCS message may be a text, in another self-defined format, generated based on the character string included in the "bodyText". For example, the RCS message sending server may parse the character string, generate a text in the JSON format, and then send the text in the JSON format to the RCS message content server. The RCS message content server may generate a text in the HTML format based on the text in the JSON format. It may be understood that the foregoing embodiments are merely examples, but are not intended to limit this disclosure.

The RCS message content server may send the text in the HTML format to the terminal device based on the content obtaining information that is of the RCS message and that is received from the RCS message sending server and based on the web page access request message sent by the terminal device, so that a result presented on the web page loaded by the browser (or browser component) installed on the terminal device is consistent with a result of presenting the RCS message on a terminal device that supports the RCS-type message.

It may be understood that the foregoing example is merely intended to help a person skilled in the art better understand the technical solutions of this disclosure, but is not intended to limit this disclosure.

In this embodiment of this disclosure, when the terminal device does not support the RCS-type message, the terminal device obtains, from the RCS message content server by using the web page address information, the content of the RCS message sent to the terminal user, and presents the content, in the rich media form, in the RCS message. This helps improve user experience.

Figure 3:
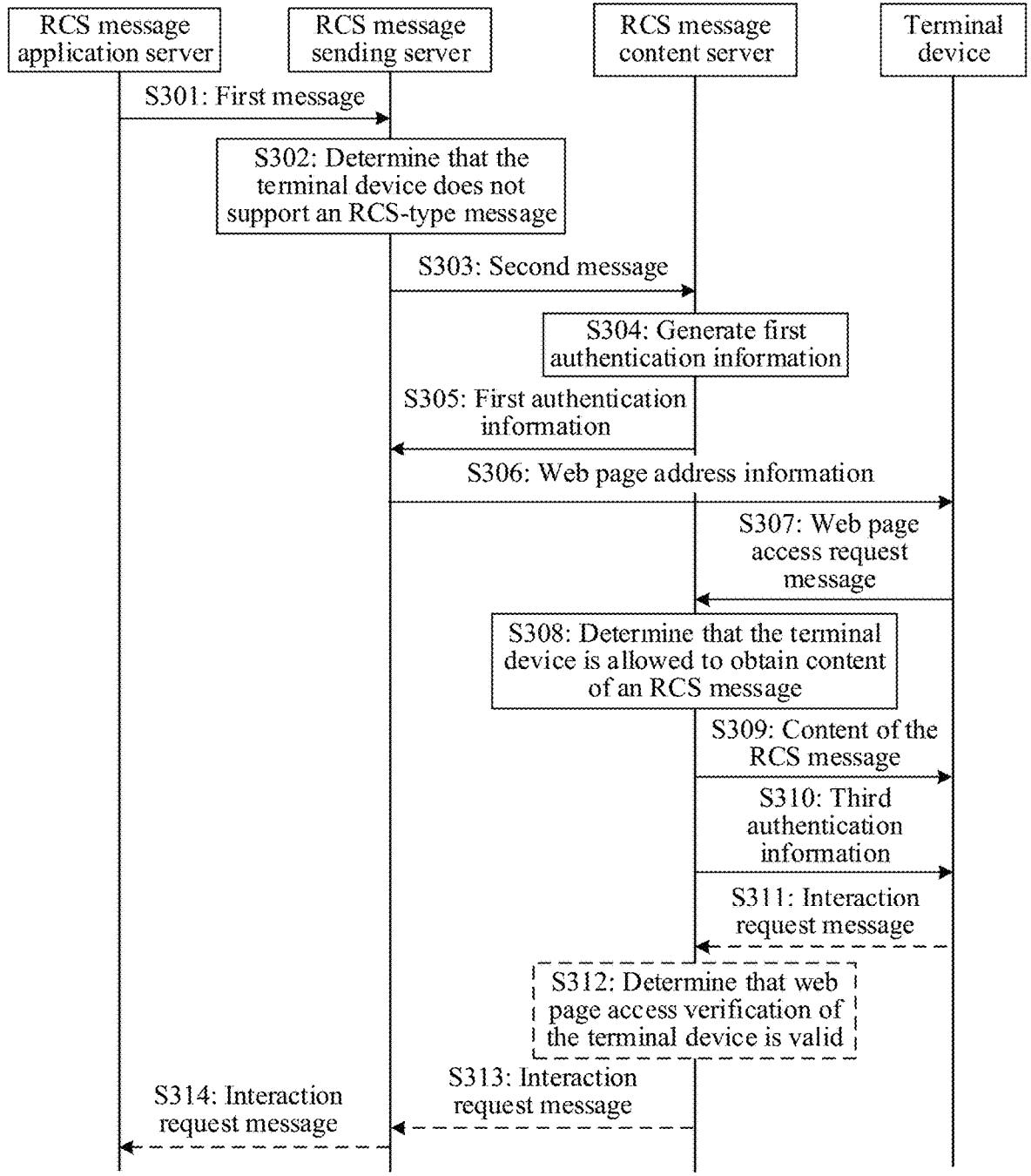
FIG. 3 is a schematic flowchart of another information sending method according to an embodiment of this disclosure.

FIG. 3 is a schematic flowchart of another information sending method according to an embodiment of this disclosure. It may be understood that although FIG. 3 shows steps or operations of the information sending method, these steps or operations are merely examples. Other operations or variations of the operations in FIG. 3 may also be performed in this embodiment of this disclosure. In addition, the steps in FIG. 3 may be performed in a sequence different from a sequence shown in FIG. 3, and it is possible that not all operations in FIG. 3 need to be performed.

S301: An RCS message application server sends a first message to an RCS message sending server, where the first message includes an RCS message and user identification information of a terminal device.

Specifically, for related descriptions of step S301, refer to step S210. To avoid repetition, details are not described herein again.

Optionally, the first message may include degradation indication information, where the degradation indication information indicates that when the RCS message sending server determines that the terminal device does not support an RCS-type message, the RCS message sending server may send a third message to the terminal device, where a content format of the third message is different from that of the RCS message.

S302: The RCS message sending server determines that the terminal device does not support the RCS-type message.

Specifically, step S302 is the same as step S220. For related descriptions, refer to the embodiment shown in FIG. 2. To avoid repetition, details are not described herein again.

S303: The RCS message sending server sends a second message to an RCS message content server, where the second message includes content obtaining information of the RCS message and the user identification information of the terminal device.

Specifically, for related descriptions of the content obtaining information of the RCS message, refer to step S230. To avoid repetition, details are not described herein again.

Optionally, when the content obtaining information of the RCS message is the RCS message or a text in another self-defined format (for example, a text in a JSON format), after receiving the content obtaining information of the RCS message, the RCS message content server may immediately generate, based on the content obtaining information of the RCS message, a web page corresponding to the content of the RCS message, and store the web page. When the terminal device requests the content of the RCS message based on web page address information, the RCS message content server directly returns content of the web page to the terminal device, or stores the content obtaining information of the RCS message (the web page is not generated based on the content obtaining information of the RCS message temporarily). When the terminal device requests the content of the RCS message based on the web page address information, the RCS message content server generates a web page based on the stored content obtaining information of the RCS message, and returns the generated web page to the terminal device. A result of presenting the generated web page on a browser (or browser component) of the terminal device that does not support the RCS-type message is consistent with a result of presenting the RCS message on a terminal device that supports the RCS-type message, so that the terminal device of a user may obtain the content of the RCS message by accessing the RCS message content server.

Optionally, when the RCS message sending server directly generates a web page, that is, when the content obtaining information of the RCS message is a text in an HTML format, after receiving the content obtaining information of the RCS message, the RCS message content server may store the text in the HTML format, that is, store the web page. When the terminal device requests the content of the RCS message based on web page address information, content of the web page is directly returned to the terminal device. Similarly, a result of presenting the web page on a browser (or browser component) of the terminal device that does not support the RCS-type message is consistent with a result of presenting the RCS message on a terminal device that supports the RCS-type message, so that the terminal device of a user may obtain the content of the RCS message by accessing the RCS message content server.

S304: The RCS message content server generates first authentication information.

Specifically, the RCS message content server generates the first authentication information, establishes a correspondence table of the first authentication information and the user identification information of the terminal device, and stores the correspondence table in a database of the RCS message content server. Further, the RCS message content server may determine the user identification information of the terminal device based on the first authentication information and the correspondence table in the database.

Optionally, the first authentication information may further identifies the content of the RCS message.

Specifically, the RCS message content server may establish a correspondence table of the first authentication information, the user identification information of the terminal device, and the content obtaining information of the RCS message. The RCS message content server may determine the content obtaining information of the target RCS message based on the first authentication information and the correspondence table, to determine the obtained content of the target RCS message based on the content obtaining information of the target RCS message.

Optionally, when there are a plurality of RCS message application servers, the correspondence table established by the RCS message content server may further include identification information of the RCS message application server. Further, the RCS message content server may determine the identification information of the RCS message application server based on the first authentication information and the correspondence table, to determine the target RCS message application server accessed by the terminal device through the RCS message content server.

For example, the first authentication information may be a character string. Optionally, the character string may be generated by a cryptographically secure pseudo-random number generator. This is not limited in this disclosure.

It may be understood that the character string is generated by the cryptographically secure pseudo-random number generator. This helps prevent brute force cracking caused by a malicious attacker's collision attempt.

Optionally, when the correspondence table includes only a correspondence between the first authentication information and the user identification information of the terminal device, the first authentication information may include one character string, that is, the character string corresponds to the user identification information of the terminal device.

Optionally, when the correspondence table includes a correspondence between the first authentication information, the user identification information of the terminal device, and the content obtaining information of the RCS message, the first authentication information may include one character string, that is, the character string corresponds to the user identification information of the terminal device and the content obtaining information of the RCS message. Alternatively, the first authentication information may include two character strings, where the two character strings respectively correspond to the user identification information of the terminal device and the content obtaining information of the RCS message.

It may be understood that the foregoing embodiments are merely intended to help a person skilled in the art better understand the technical solutions of this disclosure, but are not intended to limit this disclosure.

Optionally, in the method 300, step S304 may not be performed. In this case, the first authentication information may be generated by a third-party server, for example, may be generated by an authentication server, and then sent to the RCS message content server.

It may be understood that, for related descriptions of generating the first authentication information by the third-party server, refer to step S304.

In a possible implementation, when the authentication server generates the first authentication information, the RCS message content server may send the user identification information of the terminal device and/or the content obtaining information of the RCS message to the authentication server, and the authentication server establishes a correspondence table of the first authentication information, the user identification information of the terminal device, and/or the content obtaining information of the RCS message, and stores the correspondence table in a database of the authentication server.

Optionally, the RCS message content server may further send the identification information of the RCS message application server to the authentication server, and the correspondence table established by the authentication server may further include the identification information of the RCS message application server.

S305: The RCS message content server sends the first authentication information to the RCS message sending server.

S306: The RCS message sending server sends web page address information to the terminal device, where the web page address information is used for obtaining the content of the RCS message from the RCS message content server.

Optionally, the web page address information may include address information of the RCS message content server and the first authentication information.

Specifically, step S306 is the same as step S230. For related descriptions, refer to the embodiment shown in FIG. 2. To avoid repetition, details are not described herein again.

S307: The RCS message content server receives a web page access request message sent by the terminal device, where the web page access request message includes the web page address information.

Specifically, step S307 is the same as step S240. For related descriptions, refer to the embodiment shown in FIG. 2. To avoid repetition, details are not described herein again.

S308: The RCS message content server determines that the terminal device is allowed to obtain the content of the RCS message.

After receiving the web page access request message, the RCS message content server may verify, based on the first authentication information included in the web page address information, whether the terminal device is allowed to obtain the content of the RCS message.

Specifically, because the first authentication information is generated by the RCS message content server, the RCS message content server may find the first authentication information in data of the RCS message content server, and the first authentication information is used for determining, within a preset quantity of times, that the terminal device is allowed to obtain the content of the RCS message, so that the RCS message content server allows the terminal device to obtain the content of the RCS message.

In this embodiment of this disclosure, when the terminal device obtains the content of the RCS message from the RCS message content server, the RCS message content server may verify, based on the first authentication information, whether the terminal device is allowed to obtain the content of the RCS message, to ensure that the content of the RCS message of the terminal user is not leaked and satisfies a security requirement; in addition, the terminal user may directly obtain the content of the RCS message through the verification by using the first authentication information, and does not need to perform login authentication in a manner such as an SMS message verification code. This simplifies operation steps of the terminal device, improves operation efficiency, and helps improve user experience. For example, the preset quantity of times may be one. This is not limited in this disclosure.

Optionally, the RCS message content server is only allowed to verify, within preset duration based on the first authentication information, whether the terminal device is allowed to obtain the content of the RCS message. For example, the preset duration may be within 24 hours after the terminal device receives the web page address information. This is not limited in this disclosure.

It may be understood that the first authentication information is used for verifying, within the preset duration and the preset quantity of times, whether the terminal device is allowed to obtain the content of the RCS message. This helps prevent the first authentication information from being leaked in a manner such as forwarding or screenshot.

Optionally, when a third-party server generates the first authentication information, step S308 may not be performed in the method 300. In this case, the third-party server verifies whether the terminal device is allowed to obtain the content of the RCS message. For example, when the authentication server generates the first authentication information, the authentication server may verify whether the terminal device is allowed to obtain the content of the RCS message.

Specifically, after receiving the web page access request message of the terminal device, the RCS message content server sends an authentication request message to the authentication server, where the authentication request message includes fourth authentication information. The authentication server verifies, based on the first authentication information and the fourth authentication information, whether the terminal device is allowed to obtain the content of the RCS message. If the fourth authentication information is the same as the first authentication information, to be specific, the authentication server may find the fourth authentication information in data of the authentication server, and the fourth authentication information is used for determining, within the preset quantity of times, that the terminal device is allowed to obtain the content of the RCS message, the authentication server determines that the terminal device is allowed to obtain the content of the RCS message.

When the authentication server determines that the terminal device is allowed to obtain the content of the RCS message, the authentication server may send an authentication response message to the RCS message content server, where the authentication response message indicates that the terminal device is allowed to obtain the content of the RCS message. The RCS message content server determines, based on the authentication response message, that the terminal device is allowed to obtain the content of the RCS message.

S309: The RCS message content server returns the content of the RCS message to the terminal device based on the web page address information.

Specifically, step S310 is the same as step S250. For related descriptions, refer to the embodiment shown in FIG. 2. To avoid repetition, details are not described herein again.

S310: The RCS message content server sends third authentication information to the terminal device, where the third authentication information indicates that web page access verification of the terminal device is valid.

After the terminal device is allowed to obtain the content of the RCS message, the RCS message content server may store a state in which user verification of the terminal device is allowed, and send the third authentication information to the terminal device, where the third authentication information may indicate that the web page access verification of the terminal device is valid.

For example, the third authentication information may be data (cookie) stored on the local terminal of the user. This is not limited in this disclosure.

S311: The terminal device sends an interaction request message to the RCS message content server, where the interaction request message includes the third authentication information, and the interaction request message is used by the terminal device to perform service interaction with the RCS message application server.

For example, after the RCS message content server determines that the terminal device is allowed to obtain the content of the RCS message and sends the third authentication information to the terminal device, the terminal device may load a web page corresponding to the content of the corresponding RCS message by using an installed browser (or browser component), and the terminal device may present the content of the RCS message by using the web page. Further, the user may perform a service request operation on the web page presented by using the browser of the terminal device, to send the interaction request message to the RCS message content server.

S312: The RCS message content server determines, based on the third authentication information, that the web page access verification of the terminal device is valid.

After receiving the interaction request message sent by the terminal device, the RCS message content server may directly determine, as indicated by the third authentication information, that the terminal device is allowed to perform service interaction with the RCS message application server by using the web page corresponding to the content of the RCS message, and determine the user identification information of the terminal device.

S313: The RCS message content server sends the interaction request message to the RCS message sending server, where the interaction request message includes the user identification information of the terminal device.

S314: The RCS message sending server sends the interaction request message to the RCS message application server, where the interaction request message includes the user identification information of the terminal device.

Optionally, the RCS message content server may send the received interaction request message to the RCS message application server, where the interaction request message includes the user identification information of the terminal device, and steps S314 and S315 are not performed. This is not limited in this disclosure.

It may be understood that, the RCS message sending server determines, based on the user identification information of the terminal device, the terminal user on which the login authentication succeeds, to send a related service interaction message of the terminal user to the RCS message application server based on the interaction request message.

Figure 4:
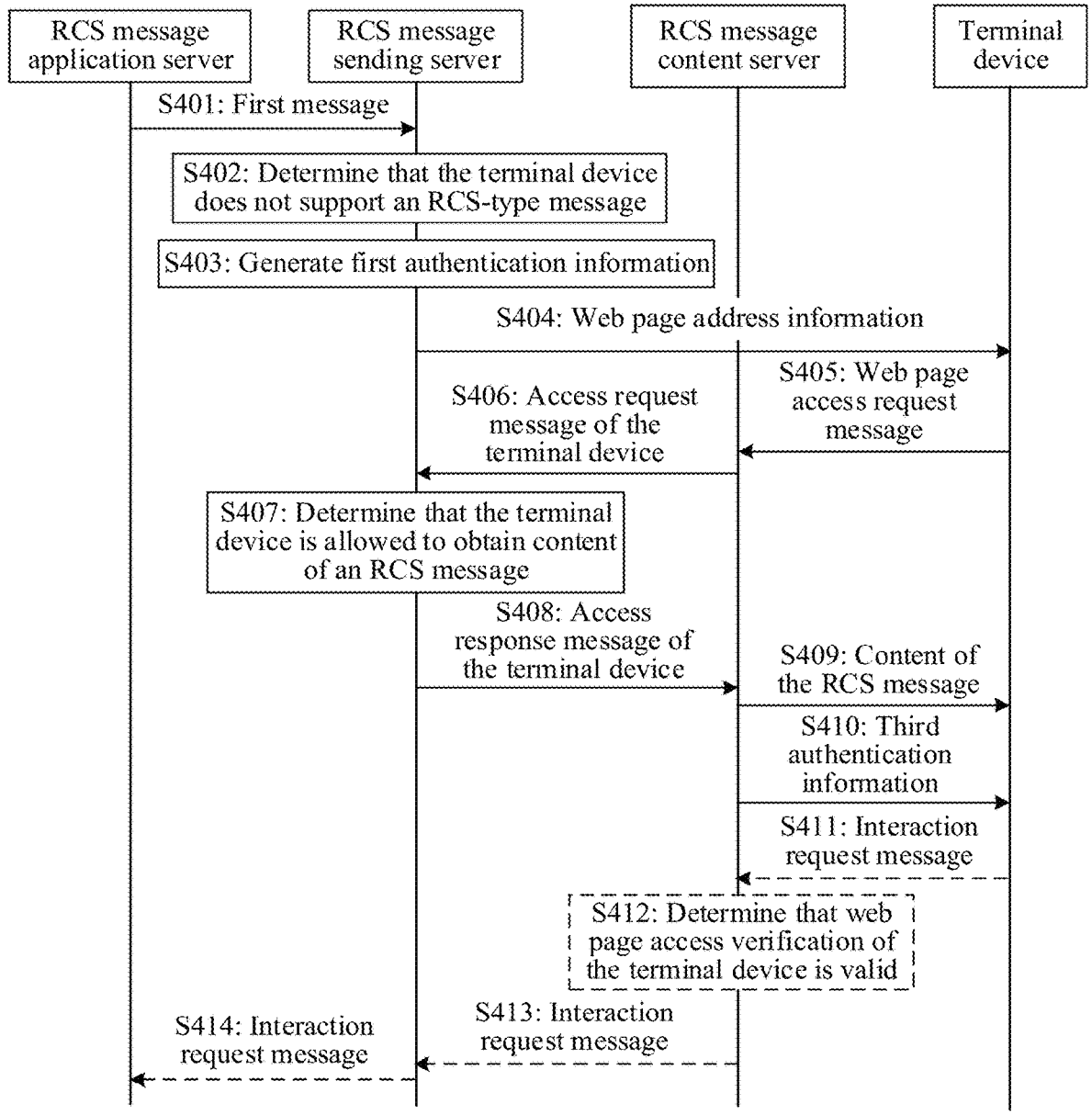
FIG. 4 is a schematic flowchart of another information sending method according to an embodiment of this disclosure.

FIG. 4 is a schematic flowchart of another information sending method according to an embodiment of this disclosure. It may be understood that although FIG. 4 shows steps or operations of the information sending method, these steps or operations are merely examples. Other operations or variations of the operations in FIG. 4 may also be performed in this embodiment of this disclosure. In addition, the steps in FIG. 4 may be performed in a sequence different from that shown in FIG. 4, and it is possible that not all operations in FIG. 4 need to be performed.

S401: An RCS message application server sends a first message to an RCS message sending server, where the first message includes an RCS message and user identification information of a terminal device.

S402: The RCS message sending server determines that the terminal device does not support an RCS-type message.

Specifically, for related descriptions of steps S401 and 402, refer to steps S210 and S220 or steps S301 and S302. To avoid repetition, details are not described herein again.

S403: The RCS message sending server generates first authentication information.

Specifically, the RCS message sending server generates the first authentication information, establishes a correspondence table of the first authentication information and the user identification information of the terminal device, and stores the correspondence table in a database of the RCS message sending server.

Optionally, the first authentication information may further identifies content of the RCS message.

Specifically, for related descriptions of the first authentication information, refer to the embodiment shown in FIG. 3. To avoid repetition, details are not described herein again.

Optionally, in the method 400, step S403 may not be performed. In this case, the first authentication information may be generated by a third-party server, for example, may be generated by an authentication server, and then sent to the RCS message sending server.

It may be understood that, for related descriptions of generating the first authentication information by the third-party server, refer to step S403.

In a possible implementation, when the authentication server generates the first authentication information, the RCS message sending server may send the user identification information of the terminal device and content obtaining information of the RCS message to the authentication server, and the authentication server establishes a correspondence table of the first authentication information, the user identification information of the terminal device, and the content obtaining information of the RCS message, and stores the correspondence table in a database of the authentication server.

Optionally, the RCS message sending server sends identification information of the RCS message application server to the authentication server, and the correspondence table established by the authentication server may further include the identification information of the RCS message application server.

S404: The RCS message sending server sends web page address information to the terminal device, where the web page address information is used for obtaining the content of the RCS message from an RCS message content server.

Specifically, for related descriptions of step S404, refer to step S306 or step S230. To avoid repetition, details are not described herein again.

S405: The RCS message content server receives a web page access request message sent by the terminal device, where the web page access request message includes the web page address information.

Specifically, for related descriptions of steps S404 and S405, refer to steps S230 and S240 or steps S306 and S307. To avoid repetition, details are not described herein again.

S406: The RCS message sending server receives an access request message that is of the terminal device and that is sent by the RCS message content server, where the access request message of the terminal device includes second authentication information.

Specifically, after the RCS message content server receives the web page access request message of the terminal device, the RCS message content server sends the access request message of the terminal device to the RCS message sending server, to determine whether the terminal device is allowed to obtain the content of the RCS message.

S407: The RCS message sending server determines, based on the first authentication information and the second authentication information, that the terminal device is allowed to obtain the content of the RCS message.

Specifically, the RCS message sending server may determine, depending on whether the first authentication information is the same as the second authentication information, whether the terminal device is allowed to obtain the content of the RCS message.

If the first authentication information is the same as the second authentication information, that is, the RCS message sending server may find the second authentication information in the database of the RCS message sending server, and the second authentication information is used for determining, within a preset quantity of times, that the terminal device is allowed to obtain the content of the RCS message, the RCS message sending server allows the terminal device to obtain the content of the RCS message.

Optionally, the preset quantity of times may be one.

Optionally, when the third-party server generates the first authentication information, step S407 may not be performed in the method 400. In this case, the RCS message sending server sends an authentication request message to the third-party server that generates the first authentication information, and the third-party server verifies whether the terminal device is allowed to obtain the content of the RCS message.

For example, the third-party server may be an authentication server. When the authentication server generates the first authentication information, after receiving the access request message of the terminal device, the RCS message sending server may send an authentication request message to the authentication server, where the authentication request message includes fifth authentication information, and the authentication server verifies, based on the first authentication information and the fifth authentication information, whether the terminal device is allowed to obtain the content of the RCS message.

Specifically, if the fifth authentication information is the same as the first authentication information, that is, the authentication server may find the fifth authentication information in the database, and the fifth authentication information is used for determining, within the preset quantity of times, that the terminal device is allowed to obtain the content of the RCS message, the RCS message sending server allows the terminal device to obtain the content of the RCS message.

When the authentication server determines that the terminal device is allowed to obtain the content of the RCS message, the authentication server may send an authentication response message to the RCS message sending server, where the authentication response message indicates that the terminal device is allowed to obtain the content of the RCS message. The RCS message sending server determines, based on the authentication response message, that the terminal device is allowed to obtain the content of the RCS message.

In this embodiment of this disclosure, the RCS message sending server verifies, based on the first authentication information and the second authentication information, whether the terminal device is allowed to obtain the content of the RCS message, to ensure that the content of the RCS message of a terminal user is not leaked and satisfies a security requirement; in addition, the terminal user may directly obtain the content of the RCS message through the verification by using the first authentication information and the second authentication information, and does not need to perform login authentication in a manner such as by using an SMS message verification code. This simplifies operation steps of the terminal device, improves operation efficiency, and helps improve user experience.

S408: The RCS message sending server sends an access response message of the terminal device to the RCS message content server, where the access response message of the terminal device indicates that the terminal device is allowed to obtain the content of the RCS message, and the access response message of the terminal device includes the content obtaining information of the RCS message and the user identification information of the terminal device.

It may be understood that the RCS message content server determines, based on the access response message of the terminal device, that the terminal device is allowed to obtain the content of the RCS message. For example, the RCS message content server may generate a web page based on the content obtaining information of the RCS message, where content presented on the web page is consistent with a result of presenting the RCS message on a terminal device that supports the RCS-type message.

S409: The RCS message content server returns the content of the RCS message to the terminal device based on the web page address information.

The terminal device may load the web page corresponding to the content of the RCS message by using an installed browser, to present the content of the RCS message.

S410: The RCS message content server sends third authentication information to the terminal device, where the third authentication information indicates that web page access verification of the terminal device is valid.

S411: The terminal device sends an interaction request message to the RCS message content server, where the interaction request message includes the third authentication information, and the interaction request message is used by the terminal device to perform service interaction with the RCS message application server.

S412: The RCS message content server determines, based on the third authentication information, that the web page access verification of the terminal device is valid.

S413: The RCS message content server sends the interaction request message to the RCS message sending server, where the interaction request message includes the user identification information of the terminal device.

S414: The RCS message sending server sends the interaction request message to the RCS message application server, where the interaction request message includes the user identification information of the terminal device.

Specifically, steps S409 to S414 are the same as steps S309 to S314. For related descriptions, refer to the embodiment shown in FIG. 3. To avoid repetition, details are not described herein again.

The methods provided in embodiments of this disclosure are described above in detail with reference to FIG. 2 to FIG. 4. Apparatuses provided in embodiments of this disclosure are described below in detail with reference to FIG. 5 to FIG. 8.

Figure 5:
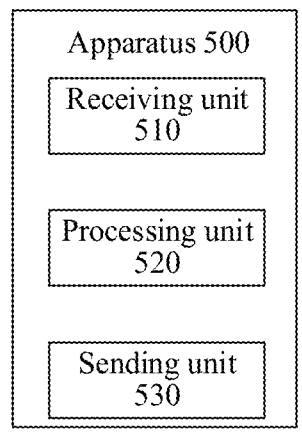
FIG. 5 is a schematic block diagram of an information sending apparatus according to an embodiment of this disclosure.

FIG. 5 is a schematic block diagram of an information sending apparatus 500 according to an embodiment of this disclosure. The apparatus 500 may correspond to the RCS message sending server described in the foregoing method, or may correspond to a chip or a component of the RCS message sending server. In addition, modules or units in the apparatus 500 may be configured to perform actions or processing processes performed by the RCS message sending server in the foregoing method. As shown in FIG. 5, the apparatus 500 includes a receiving unit 510, a processing unit 520, and a sending unit 530.

The receiving unit 510 is configured to receive a first message sent by an RCS message application server, where the first message includes an RCS message and user identification information of a terminal device.

The processing unit 520 is configured to determine that the terminal device does not support an RCS-type message.

The sending unit 530 is configured to send web page address information to the terminal device, where the web page address information is used for obtaining content of the RCS message from an RCS message content server.

Optionally, the sending unit 530 is further configured to send a second message to the RCS message content server, where the second message includes content obtaining information of the RCS message and the user identification information of the terminal device.

Optionally, the receiving unit 510 is further configured to receive, from the RCS message content server, first authentication information generated by the RCS message content server.

Optionally, the receiving unit 510 is further configured to receive an access request message that is of the terminal device and that is sent by the RCS message content server, where the access request message of the terminal device includes second authentication information.

Optionally, the processing unit 520 is further configured to determine, based on the first authentication information and the second authentication information, that the terminal device is allowed to obtain the content of the RCS message.

Optionally, the sending unit 530 is further configured to send an access response message of the terminal device to the RCS message content server, where the access response message of the terminal device indicates that the terminal device is allowed to obtain the content of the RCS message.

Optionally, the sending unit 530 is further configured to send a third message to the terminal device, where the third message includes the web page address information, and a content format of the third message is different from that of the RCS message.

Optionally, the processing unit 520 is further configured to determine that the terminal device supports the third message.

Optionally, the receiving unit 510 is further configured to receive an interaction request message sent by the RCS message content server, where the interaction request message includes the user identification information of the terminal device, and the interaction request message is used by the terminal device to perform service interaction with the RCS message application server.

Optionally, the sending unit 530 is further configured to send the interaction request message to the RCS message application server.

It may be understood that for a specific process in which each unit in the apparatus 500 performs the foregoing corresponding step, refer to the descriptions of the foregoing method embodiments with reference to FIG. 2 to FIG. 4. For brevity, details are not described herein again.

Figure 6:
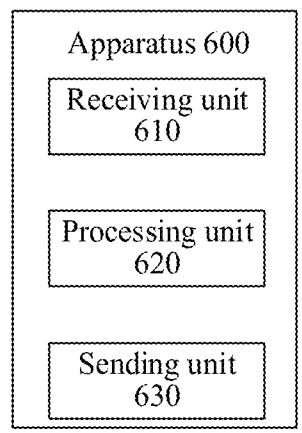
FIG. 6 is a schematic block diagram of another information sending apparatus according to an embodiment of this disclosure.

FIG. 6 is a schematic block diagram of an information sending apparatus 600 according to an embodiment of this disclosure. The apparatus 600 may correspond to the RCS message content server described in the foregoing method, or may correspond to a chip or a component of the RCS message content server. In addition, modules or units in the apparatus 600 may be configured to perform actions or processing processes performed by the RCS message content server in the foregoing method. As shown in FIG. 6, the apparatus 600 includes a receiving unit 610, a processing unit 620, and a sending unit 630.

The receiving unit 610 is configured to receive a web page access request message sent by a terminal device, where the web page access request message includes web page address information, and the web page address information is used for obtaining content of an RCS message from the apparatus 600. The sending unit 630 is configured to return the content of the RCS message to the terminal device based on the web page address information.

Optionally, the receiving unit 610 is further configured to receive a second message sent by an RCS message sending server, where the second message includes content obtaining information of the RCS message and user identification information of the terminal device.

Optionally, the processing unit 620 is configured to generate first authentication information.

Optionally, the sending unit 630 is configured to send the first authentication information to the RCS message sending server.

Optionally, the processing unit 620 is further configured to determine, based on the first authentication information, that the terminal device is allowed to obtain the content of the RCS message.

Optionally, the sending unit 630 is further configured to send an access request message of the terminal device to the RCS message sending server, where the access request message of the terminal device includes second authentication information.

Optionally, the receiving unit 610 is further configured to receive an access response message that is of the terminal device and that is sent by the RCS message sending server, where the access response message of the terminal device indicates that the terminal device is allowed to obtain the content of the RCS message.

Optionally, the sending unit 630 is further configured to send third authentication information to the terminal device, where the third authentication information indicates that web page access verification of the terminal device is valid.

Optionally, the receiving unit 610 is further configured to receive an interaction request message sent by the terminal device, where the interaction request message includes the third authentication information, and the interaction request message is used by the terminal device to perform service interaction with an RCS message application server.

Optionally, the processing unit 620 is further configured to determine, based on the third authentication information, that the web page access verification of the terminal device is valid.

Optionally, the sending unit 630 is further configured to send an interaction request message to the RCS message sending server, where the interaction request message includes the user identification information of the terminal device.

It may be understood that for a specific process in which each unit in the apparatus 600 performs the foregoing corresponding step, refer to the descriptions of the foregoing method embodiments with reference to FIG. 2 to FIG. 4. For brevity, details are not described herein again.

Figure 7:
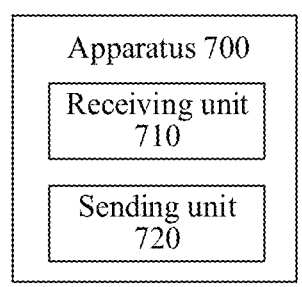
FIG. 7 is a schematic block diagram of another information sending apparatus according to an embodiment of this disclosure.

FIG. 7 is a schematic block diagram of an information sending apparatus 700 according to an embodiment of this disclosure. The apparatus 700 may correspond to the terminal device described in the foregoing method, or may correspond to a chip or a component of the terminal device. In addition, modules or units in the apparatus 700 may be configured to perform actions or processing processes performed by the terminal device in the foregoing method. As shown in FIG. 7, the apparatus 700 includes a receiving unit 710 and a sending unit 720.

The receiving unit 710 is configured to receive web page address information sent by an RCS message sending server, where the web page address information is used for obtaining content of an RCS message from an RCS message content server.

The receiving unit is further configured to obtain the content of the RCS message from the RCS message content server based on the web page address information.

Optionally, the sending unit 720 is configured to send a web page access request message to the RCS message content server based on the web page address information.

Optionally, the receiving unit 710 is further configured to receive a third message sent by the RCS message sending server, where the third message includes the web page address information, and a content format of the third message is different from that of the RCS message.

Optionally, the receiving unit 710 is further configured to receive third authentication information sent by the RCS message content server, where the third authentication information indicates that web page access verification of the apparatus is valid.

Optionally, the sending unit 720 is further configured to send an interaction request message to the RCS message content server, where the interaction request message includes the third authentication information, and the interaction request message is used by the apparatus 700 to perform service interaction with an RCS message application server.

It may be understood that for a specific process in which each unit in the apparatus 700 performs the foregoing corresponding step, refer to the descriptions of the foregoing method embodiments with reference to FIG. 2 and FIG. 3. For brevity, details are not described herein again.

The apparatus 500 in each of the foregoing solutions has a function of implementing corresponding steps performed by the RCS message sending server in the foregoing method, the apparatus 600 in each of the foregoing solutions has a function of implementing corresponding steps performed by the RCS message content server in the foregoing method, and the apparatus 700 in each of the foregoing solutions has a function of implementing corresponding steps performed by the terminal device in the foregoing method. The function may be implemented by hardware or software, or may be implemented by hardware executing corresponding software. The hardware or the software includes one or more modules corresponding to the foregoing functions. For example, the sending unit may be replaced with a communication interface; the receiving unit may be replaced with a communication interface; and another unit, for example, a processing unit, may be replaced with a processor, to separately perform a sending operation, a receiving operation, and a related processing operation in the method embodiments. In embodiments of this disclosure, a communication interface of an apparatus is used by the apparatus to communicate with another device. For example, the communication interface may be a transmitter, a receiver, a transceiver, a circuit, a bus, a module, a pin, or another type of communication interface. This is not limited in embodiments of this disclosure.

In a specific implementation process, the processor may be configured to perform, for example without limitation to, baseband related processing, and the communication interface may be configured to perform, for example without limitation to, information exchange. The foregoing components may be separately disposed on chips that are independent of each other, or at least some or all of the components may be disposed on a same chip. For example, the processor may be further classified into an analog baseband processor and a digital baseband processor; and the analog baseband processor and the communication interface may be integrated on a same chip, and the digital baseband processor may be disposed on an independent chip. With continuous development of integrated circuit technologies, more and more components may be integrated on a same chip. For example, the digital baseband processor may be integrated on a same chip with a plurality of application processors (for example, but not limited to a geometric processor and a multimedia processor). Such a chip may be referred to as a system on chip (SOC). Whether components are independently disposed on different chips or are integrated on one or more chips usually depends on specific requirements of a product design. Embodiments of this disclosure impose no limitation on specific implementations of the foregoing components.

Figure 8:
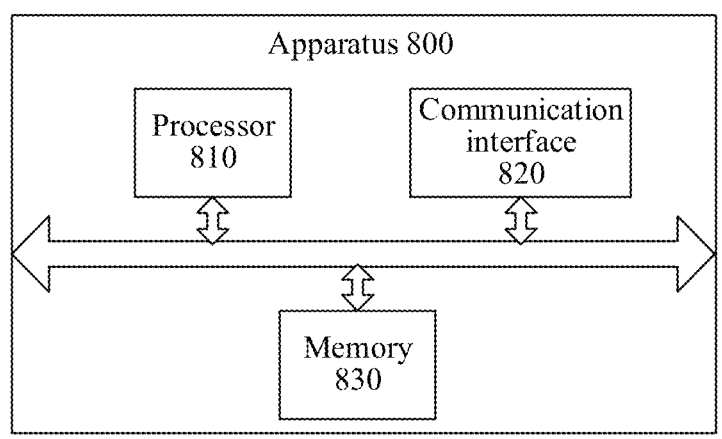
FIG. 8 is a schematic block diagram of an information sending apparatus according to an embodiment of this disclosure.

It may be understood that the processor in the foregoing embodiments may execute program instructions by using a hardware platform having a processor and a communication interface, to separately implement a function of the processor in any design in the foregoing embodiments of this disclosure. Based on this, as shown in FIG. 8, an embodiment of this disclosure provides a schematic block diagram of an information sending apparatus 800. The apparatus 800 includes a processor 810, a communication interface 820, and a memory 830. The processor 810, the communication interface 820, and the memory 830 are coupled to communicate with each other. The memory 830 is configured to store instructions. The processor 810 is configured to execute the instructions stored in the memory 830, to control the communication interface 820 to send a signal and/or receive a signal. The coupling in embodiments of this disclosure is indirect coupling or a communication connection between apparatuses, units, or modules, may be in an electrical form, a mechanical form, or another form, and is used for information exchange between the apparatuses, the units, or the modules.

It may be understood that the apparatus in FIG. 5, the apparatus in FIG. 6, or the apparatus in FIG. 7 in embodiments of this disclosure may be implemented by using the apparatus 800 in FIG. 8, and may be configured to perform steps and/or procedures corresponding to the transmit end and the receive end in the foregoing method embodiments.

It may be understood that the methods, the procedures, the operations, or the steps in the designs described in embodiments of this disclosure can be implemented in a one-to-one correspondence manner by computer software, electronic hardware, or a combination of computer software and electronic hardware. Whether these functions are performed by hardware or software depends on particular applications and design constraints of the technical solutions. For example, in terms of good universality, low costs, and decoupling between software and hardware, program instructions may be executed to implement the functions. For another example, in terms of system performance and reliability, a dedicated circuit may be used to implement the functions. A person of ordinary skill in the art may use different methods to implement the described functions for each particular application. This is not limited herein.

In embodiments of this disclosure, it should be noted that the method embodiments in embodiments of this disclosure may be applied to a processor, or implemented by a processor. The processor may be an integrated circuit chip with a signal processing capability. In an implementation process, the steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The foregoing processor may implement or perform the methods, the steps, and logical block diagrams that are disclosed in embodiments of this disclosure. The general-purpose processor may be a microprocessor, any conventional processor, or the like.

It may be understood that the memory in embodiments of this disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. There are a plurality of different types of RAMs, such as a static random-access memory (static RAM, SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM).

It may be understood that sequence numbers of the foregoing processes do not mean an execution sequence in various embodiments of this disclosure. The execution sequence of the processes should be determined based on functions and internal logic of the processes, and should not be construed as any limitation on the implementation processes of embodiments of this disclosure.

The terms "first", "second", and the like in this disclosure are merely used to distinguish different objects, and "first" and "second" do not limit an actual sequence or functions of objects modified by "first" and "second". Any embodiment or design solution described as "example", "for example", "such as", "optionally", or "in some implementations" in this disclosure should not be construed as being more preferred or more advantageous than another embodiment or design solution. To be specific, these terms are used to present a related concept in a specific manner.

Names may be assigned to various objects that may appear in this disclosure, for example, various messages/information/devices/network elements/systems/apparatuses/operations. It may be understood that these specific names do not constitute a limitation on the related objects, and the assigned names may change with a factor such as a scenario, a context, or a use habit. Understanding of technical meanings of technical terms in this disclosure should be determined mainly based on functions and technical effects that are of the technical terms and that are reflected/performed in the technical solutions.

All or some of the foregoing embodiments may be implemented by using software, hardware, firmware, or any combination thereof. When software is used for implementing the embodiments, all or some of the embodiments may be implemented in a form of a computer program product. The computer program product may include one or more computer instructions. When the computer program instructions are loaded and executed on a computer, all or some of the procedures or the functions according to embodiments of this application are generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive ((SSD)), or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

A person skilled in the art may clearly understand that, for the purpose of convenient and brief description, for detailed working processes of the foregoing system, apparatus, and unit, refer to corresponding processes in the foregoing method embodiments. Details are not described herein again. In embodiments of this disclosure, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:
1. A system for sending information, comprising:
   a rich communication suite (RCS) message sending server configured to:

receive a first message from an RCS message application server, wherein the first message comprises an RCS message and user identification information of a terminal device;

determine that the terminal device does not support an RCS-type message; and send, in response to determining that the terminal device does not support the RCS-type message, a second message to an RCS message content server, wherein the second message includes content obtaining information of the RCS message and the user identification information; and the RCS message content server configured to:

receive the second message from the RCS message sending server;

generate first authentication information; and send the first authentication information to the message sending server, wherein the RCS message sending server is further configured to:

receive the first authentication information, wherein the first authentication information is for verifying whether the terminal device is allowed to obtain content of the RCS message; and send web page address information to the terminal device, wherein the web page address information is used for obtaining the content of the RCS message from the RCS message content server, wherein the web page address information comprises address information of the RCS message content server and the first authentication information, and wherein the RCS message content server is further configured to:

receive a web page access request message from the terminal device, wherein the web page access request message comprises the web page address information;

verify, based on the first authentication information included in the web page address information, that the terminal device is allowed to obtain the content of the RCS message; and return the content of the RCS message to the terminal device.

2. The system of claim 1, wherein the RCS message content server is further configured to detect that the terminal device is allowed to obtain the content of the RCS message.

3. The system of claim 1, wherein the RCS message content server is further configured to send third authentication information to the terminal device, wherein the third authentication information indicates that web page access verification of the terminal device is valid.

4. The system of claim 3, wherein the RCS message content server is further configured to:

receive an interaction request message from the terminal device for performing service interaction with the RCS message application server, wherein the interaction request message comprises the third authentication information;

detect, based on the third authentication information, that the web page access verification of the terminal device is valid; and send the interaction request message to the RCS message sending server, wherein the interaction request message comprises the user identification information of the terminal device.

5. The system of claim 1, wherein the RCS message sending server is further configured to determine whether the terminal device supports the RCS-type message based on whether an RCS client corresponding to the RCS message application server is installed on the terminal device.

6. A method comprising:

receiving, by a rich communication suite (RCS) message sending server, a first message from an RCS message application server, wherein the first message comprises an RCS message and user identification information of a terminal device;

determining, by the RCS message sending server, that the terminal device does not support an RCS-type message;

sending, by the RCS message sending server and in response to determining that the terminal device does not support the RCS-type message, a second message to an RCS message content server, wherein the second message includes content obtaining information of the RCS message and the user identification information;

receiving, by the RCS message content server, the second message from the RCS message sending server;

generating, by the RCS message content server, first authentication information;

sending, by the RCS message content server, the first authentication information to the message sending server;

receiving, by the RCS message sending server, the first authentication information, wherein the first authentication information is for verifying whether the terminal device is allowed to obtain content of the RCS message;

sending, by the RCS message sending server, web page address information to the terminal device, wherein the web page address information is used for obtaining the content of the RCS message from the RCS message content server, and wherein the web page address information comprises address information of the RCS message content server and the first authentication information;

receiving, by the RCS message content server, a web page access request message from the terminal device, wherein the web page access request message comprises the web page address information;

verifying, by the RCS message content server and based on the first authentication information included in the web page address information, that the terminal device is allowed to obtain the content of the RCS message; and returning, by the RCS message content server, the content of the RCS message to the terminal device.

7. The method of claim 6, further comprising detecting, by the RCS message content server, that the terminal device is allowed to obtain the content of the RCS message.

8. The method of claim 6, further comprising sending, by the RCS message content server, third authentication information to the terminal device, wherein the third authentication information indicates that web page access verification of the terminal device is valid.

9. The method of claim 8, further comprising:

receiving, by the RCS message content server, an interaction request message from the terminal device for performing service interaction with the RCS message application server, wherein the interaction request message comprises the third authentication information;

detecting, by the RCS message content server and based on the third authentication information, that the web page access verification of the terminal device is valid; and sending, by the RCS message content server, the interaction request message to the RCS message sending server, wherein the interaction request message comprises the user identification information of the terminal device.

10. The method of claim 6, further comprising determining, by the RCS message sending server, whether the terminal device supports the RCS-type message based on whether an RCS client corresponding to the RCS message application server is installed on the terminal device.

* * * * *